United States Patent Office 3,065,080
Patented Nov. 20, 1962

3,065,080
YEAST-RAISED BAKED PRODUCTS AND METHOD OF MAKING THE SAME
Daniel Melnick, Teaneck, and Hans W. Vahlteich, Englewood, N.J., and Raymond T. Bohn, Scarsdale, N.Y., assignors to Corn Products Company, New York, N.Y., a corporation of Delaware
No Drawing. Filed July 3, 1961, Ser. No. 121,384
8 Claims. (Cl. 99—90)

This invention relates to novel compositions as well as to an improved method of preparing baked products from yeast-raised doughs.

This is a continuation-in-part application of application Serial No. 710,194, filed January 21, 1958, now issued as U.S. Patent No. 2,997,394, and of application Serial No. 443,966, filed July 16, 1954, now abandoned.

In the manufacture of yeast-raised baked products, three types of microbiological material or microorganisms are of concern. One of these is yeast which produces gas in fermenting sugar and thereby contributes leavening action to the dough. Such microorganisms should not be inhibited, since proper leavening is essential to bread manufacture. The second type of microorganisms is of the class which included *Bacillus mesentericus*. The spores of these microorganisms are not destroyed in baking. They become active in the baked product and contribute to off-flavors and to an undesirable pasty texture, i.e. the so-called "rope" formation, in bread. The third type of microorganisms are the molds. They produce obnoxious appearance and flavor in baked products.

The fungistatic materials usually employed in baked goods will inhibit the growth of all three types of microorganisms mentioned above. The inhibition of yeast fermentation is not wanted however, and so the baker must extend fermentation time to obtain desirable mold protection or use very small concentrations of the fungistats. The situation is aggravated in the summer, when it is necessary to employ larger amounts of fungistic material to overcome mold spoilage. It happens that the minimal concentration employed for desired mold inhibition may be very close to the maximal concentration of fungistat beyond which undue interference with yeast fermentation occurs.

In the preparation of baked goods, the fungistic agent is added to the aqueous phase of the dough. The fungistat comes into direct contact with yeast and can thereby inhibit fermentation. As previously indicated, manufacturers strive to employ the fungistat in quantities which cause the least interference with fermentation, but unfortunately the amount needed to obtain the desired inhibition of subsequent mold growth causes significant interference with yeast fermentation. To date, prior art workers have moved in the direction of adding the fungistat to the aqueous phase of the dough in minimal concentrations for mold inhibition so that reduced interference with yeast fermentation would be realized; others are content to accept extended fermentation times resulting from direct addition of higher concentrations of the fungistat to the aqueous phase of the dough.

In yeast-raised white bread, fat constitutes about 3% by weight of the total flour used in making the dough and in some cases it may be as low as 1%. To obtain the desired fungistatic level in the baked product made with 3% of a fat composition containing a fungistat, the fatty composition must contain approximately 33 times the desired final concentration in the end items. No such practice exists in the baking industry. In the bread industry, concentrations of ingredients are regularly expressed in relation to flour weight. Thus, with flour taken as 100%, the other ingredients which are used in making dough are about 60% water, about 7% sugar, about 3% yeast, about 3.5% milk powder (or its equivalent as milk) and about 2% common salt (NaCl). Minor ingredients include yeast nutrients plus oxidizing agents and are present in concentrations of less than about 1%.

The two commonly used methods of dough mixing employed by the baking industry are the so-called "straight dough" and "sponge dough" methods. The former is a single-step process, in which all the ingredients are mixed together in a single batch. Ordinarily, the fermentation time is about 4 to 5 hours, including that time required for the final proofing (raising of dough in baking pans). Within a given establishment, a standard fermentation time is followed closely, even though this may vary from one bakery to another due to such factors as character of flour, amount of yeast, temperature, formula ingredients, level of oxidation, etc. Variations in standard fermentation time within a given shop not only reduce efficiency in operation but also jeopardize quality and uniformity of the end-product.

The sponge dough method consists of two distinct steps, namely, the sponge stage and the dough stage. The sponge stage involves mixing part of the dough ingredients and allowing preliminary fermentation. The sponge usually comprises 50% to 75% of the total flour of the complete dough, all the yeast and yeast nutrients, and sufficient water for a moderately stiff dough. If dough conditioners and malt are employed, these are also added at this stage. Fermentation time for the sponge is usually between 3 to 4 hours, and usually does not exceed 5 hours. At the dough stage, the fermented sponge is returned to the mixer and additional ingredients are added. These include the remaining flour and water, milk solids, salt, sugar, and shortening. Fermentation time from this point on, including final proofing, ranges from 1 to 2 hours. Since the sponge method of making doughs is more flexible in continuing operations and gives bread of greater volume and more desirable grain and texture, it is by far the most popular method in use in this country. About 90% of the bread is produced this way.

A third method allowing continuous dough preparation has recently been introduced in this country. In this operation, a broth comprising sugar, yeast, salt and water is allowed to ferment, and this fermented broth is then pumped into a mixer to which are fed flour, milk solids, extra sugar, salt, oxidants and shortening. The dough is usually immediately divided and panned. Fermentation time of the dough in this operation is about 1 hour. In other operations, the dough is formed at periodic intervals in high-speed mixtures and is then handled as described above for the dough in the sponge process.

The problem which has faced the manufacturer of yeast-raised baked products of attaining suitable resistance against microbiological spoilage without interference with yeast fermentation in the dough stage, is best illustrated by the results given below. In Table I are presented the basic dough formulae employed.

TABLE I

*Dough Formulas Employed in the Applicants' Investigation*

| Dough process | Ingredient | | Processing |
|---|---|---|---|
| | Identity | Parts (by weight) | |
| Straight | Flour | 100 | Temperature, 80° F. |
| | Water | 60 | Fermentation time: |
| | Sugar | 7 | First punch, 2 hr. |
| | Milk powder | 4 | Second punch, 1 hr. 10 min. |
| | Lard | 3 | To molder, 20 min. |
| | Yeast | 3 | Total, 3 hr. 30 min. |
| | Salt | 2 | Proofing, 1 hr. 6 min. |
| | Conditioner [1] | 0.5 | Over-all total, 4 hr. 36 min. |
| | | | Baked at 450° F. for 25 min. |
| Sponge | SPONGE STAGE | | |
| | Flour | 70 | Temperature, 78° F. |
| | Water | 42 | Fermentation time, 3 hr. 30 min. |
| | Yeast | 3 | |
| | Conditioner [1] | 0.3 | |
| | DOUGH STAGE | | |
| | Flour | 30 | Temperature, 78° F. |
| | Water | 21 | Fermentation time: |
| | Sugar | 7 | To molder, 20 min. |
| | Milk powder | 3.5 | Proofing, 1 hr. 20 min. |
| | Lard | 3 | Total, 1 hr. 40 min. |
| | Salt | 2 | Baked at 450° F. for 25 min. |

[1] Yeast food plus oxidizing agents.

In Table II below are given the results obtained with sorbic acid as the fungistatic material which was dissolved in the aqueous phase of the dough, in accordance with the present practice in the industry. Since it is known that the fungistatic material interferes with yeast fermentation, the additive was dissolved in the water at the dough stage when the sponge method was employed. By this expedient the major portion of yeast fermentation proceeds without inhibitors being present. The fungistatic agent could not be added just prior to baking, since raising of the dough prior to molding and after panning are essential for obtaining a proper loaf of bread.

TABLE II

*Influence of Sorbic Acid on Yeast Fermentation*

| Dough | | | Proof time,[2] min. | Bread | |
|---|---|---|---|---|---|
| Process | No. | Fungistatic additive,[1] percent | | Measurement,[3] in. | pH[4] |
| Straight | 1 | None | 66 | 41.0 | 5.32 |
| | 2 | 0.025 | 68 | 41.5 | 5.35 |
| | 3 | 0.05 | 78 | 40.5 | 5.32 |
| | 4 | 0.10 | 83 | 40.5 | 5.40 |
| | 5 | 0.20 | 240 | 38.0 | 5.38 |
| Sponge | 6 | None | 80 | 46.0 | 5.41 |
| | 7 | 0.025 | 81 | 45.5 | 5.41 |
| | 8 | 0.05 | 97 | 45.5 | 5.39 |
| | 9 | 0.10 | 125 | 44.5 | 5.39 |
| | 10 | 0.20 | 250 | 43.5 | 5.35 |

[1] Percentages expressed on a flour basis. Values on a dough basis are 55% and on a bread basis 66% of the percentages listed above.
[2] 18 ounces of dough allowed to rise in the pan to the same height in the case of the straight doughs and 20 ounces in the case of the sponge doughs.
[3] Summation in inches of two perimeters of the loaf, one measured lengthwise at the center of the loaf, the other widthwise, also at the center of the loaf. (This method of expressing loaf size is commonly employed in the industry.)
[4] Of a 10% aqueous suspension.

From the results shown in Table II above, it is apparent that with increasing concentration of fungistatic material in the dough there is increasing interference with yeast fermentation and consequently longer proof time is required. Only very small concentrations of this material, viz., 0.025% sorbic acid expressed on the flour-weight basis, may be added without inhibiting yeast activity. The critical level at which interference with yeast activity is first noted is 0.0375% in the case of sorbic acid. Expressed in terms of a yeast-raised baked product with 3% fat in the dough, the fat would have to contain 1.25% sorbic acid to provide 0.0375% of the fungistat in the dough. With increasing concentration of the fungistatic agents, there is also noted a decrease in bread volume but, insofar as this effect is concerned, there is about a substantial increase in tolerance, viz., 0.05% sorbic acid may be tolerated. Thus, by extending the proof time of the doughs, acceptable loaves of bread may be obtained with higher concentrations of fungistat. However, such a solution is not practical if a certain production quota is sought, unless additional proofing facilities are provided. At still higher concentrations of fungistatic material than those mentioned, increase in proofing time is not adequate to compensate for the loss in bread volume. Using a constant maturing time for the doughs prior to panning at such higher concentration, results in so-called "young" doughs, and these yield loaves of smaller volume. Extension of maturing time could correct this defect, but this adds to the inefficiency of plant operation. An increase in yeast, slightly higher dough or proof box temperature and/or a little less salt will take care of small increases in proof time but such modifications are inadequate to compensate for the interference in yeast fermentation when the higher concentrations of fungistatic material is employed. The pH values of the bread (and of the doughs) are all of the same order of magnitude and indicate that a change in pH is not responsible for inhibition of yeast activity.

In order to follow more specifically and with less labor the action of the fungistatic agent on yeast fermentation, tests were run using the Blish-Sandstedt pressuremeter method (Cereal Laboratory Methods, 5th Edition, page 101 (1947), published by the American Association of Cereal Chemists, St. Paul, Minnesota) to measure the volume of carbon dioxide produced in terms of mm. of mercury pressure generated in the closed system at 30° C. In one series, flour, water and yeast comprised the basic straight dough; in the other, 3% sugar on the flour basis was included. The results are summarized in Table III below.

TABLE III

*Gas Production From Straight Doughs Made With and Without Added Sorbic Acid*

| Series | Fungistatic additive, percent | $CO_2$ production as mm. Hg during— | | | | | | |
|---|---|---|---|---|---|---|---|---|
| | | 1st hour | 2nd hour | 3rd hour | 4th hour | 5th hour | 6th hour | Total 6 hours |
| No sugar added | None | 97 | 146 | 139 | 65 | 49 | 41 | 537 |
| | 0.025 | 95 | 147 | 138 | 67 | 50 | 40 | 537 |
| | 0.05 | 86 | 131 | 155 | 77 | 51 | 39 | 539 |
| | 0.10 | 57 | 74 | 94 | 101 | 85 | 62 | 473 |
| | 0.20 | 39 | 42 | 46 | 39 | 32 | 29 | 27 | 212 |
| 3% sugar on the flour basis added | None | 117 | 145 | 121 | 117 | 110 | 92 | 703 |
| | 0.025 | 110 | 161 | 135 | 118 | 109 | 94 | 727 |
| | 0.05 | 92 | 164 | 146 | 130 | 118 | 85 | 735 |
| | 0.10 | 73 | 139 | 137 | 107 | 95 | 79 | 630 |
| | 0.20 | 40 | 60 | 69 | 66 | 60 | 48 | 343 |

The data in Table III indicate that the sorbic acid does not adversely affect the amylase activity of the flour so that restriction of available substrate (the sugar) for yeast fermentation is not the factor responsible for a lower rate of gas production. In the presence of added substrate, the fungistatic material is just as effective in reducing the rate and degree of yeast fermentation. The added sugar merely promotes greater carbon dioxide gas ($CO_2$) production in all systems. With the lower concentration of fungistatic material, viz., up to 0.05% sorbic acid, gas formation is normal by the end of the 6-hour period. Only with the lowest concentrations, 0.025% of sorbic acid is $CO_2$ production unimpaired during the first hour of observation. These results indicate that only with the lowest concentration, would there be no interference with yeast activity in doughs. The somewhat higher concentrations, viz., 0.05% sorbic acid may be employed provided sufficient fermentation time is allowed. The highest concentration, more than 0.10% of sorbic acid may not be used because of the strong inhibiting action on the rate of fermentation; available maltose and other fermentable sugars derived from the starch in the flour or from the added sucrose were not exhausted after the six hours of fermentation. These findings and conclusions agree with those obtained in the studies of the complete doughs described earlier (see Tables I and II above).

In Table IV below are presented some of the results obtained in evaluating the resistance to mold spoilage of the breads produced from the complete doughs described hereinabove. Three test methods were employed. Just after the baked breads dropped in temperature to about 100° F., loaves were sprayed on the top and sides with a suspension of mixed molds isolated from moldy bread. The spray was allowed to dry after which the loaves were placed in a Pliofilm (rubber hydrochloride) bag and incubated at 80°–90° F. In the second type of test, slices of the breads were sprayed with the mold suspension, the slices re-stacked in loaf form, and the latter stored in Pliofilm bags at 80°–90° F. In the third type of test, a slice from each bread was placed in a Petri dish, and sprayed with the mold suspension. A moistened filter paper was placed in the top cover of the Petri dish. The assembly was then stored at 80°–90° F. Examinations of the inoculated samples were made at the end of consecutive 24-hour periods; the results obtained at the conclusion of the tests are recorded in Table IV. The same relative picture of fungistatic activity was obtained at the earlier examination periods but mold growth was less.

TABLE IV

*Protection of Breads Against Mold Spoilage*

| Dough | | Mold growth after inoculation [2] | | |
|---|---|---|---|---|
| No. | Fungistatic additive,[1] percent | Test one— On crust after 96 hours | Test two— Between slices after 72 hours | Test three— On exposed slices after 48 hours |
| 1 | None | XXX | XXXX | XXXXXX |
| 2 | 0.025 | XX | XXX | XXXXX |
| 3 | 0.05 | X | XX | XXX |
| 4 | 0.10 | 0 | 0 | X |
| 5 | 0.20 | 0 | 0 | 0 |
| 6 | None | XXX | XXXXX | XXXXXX |
| 7 | 0.025 | X | XXX | XXXX |
| 8 | 0.05 | 0 | XX | XXX |
| 9 | 0.10 | 0 | X | X |
| 10 | 0.20 | 0 | 0 | 0 |

[1] Sorbic acid.
[2] See text for description of test methods; "0" means no growth; "X's" reflect degree of growth.

It will be noted from the results presented in Table IV that the extent of mold propagation was least on the crust surfaces (which have a lower moisture content) and greatest on the exposed slice stored in an environment of high humidity (Test Three).

At the higher levels of sorbic acid, good protection against mold spoilage was obtained. However, this coincided with the undesirable inhibition of yeast activity in the doughs (see Tables II and III above). Thus, the baker under present day practices must of necessity make a compromise; he may use sorbic acid at a level of 0.025%, on the flour-weight basis to obtain no interference with yeast activity and be resigned to very little protection of his baked products against mold spoilage or use 0.05% and accept problems associated with interference in dough maturation and proofing. Bakers in general are unwilling to make such compromise.

Comparable studies involving inoculation of the doughs with spores of *Bacillus mesentericus*, the "rope"-producing organism, indicated that "rope" formation at 85°–90° F. was inhibited at concentrations well below that required for effective protection against mold spoilage; viz., 0.025% of sorbic acid.

In our copending application Serial No. 710,194, filed January 21, 1958, we have described a method and compositions by which the above mentioned disadvantages of the prior art procedure are substantially overcome. According to the methods described in our copending application, fungistats such as sorbic acid are incorporated in fats and the melting point of the fat vehicle is inversely correlated with the preferential solubility of the fungistat in fat. The solubility is expressed in terms of the distribution coefficient, which is the ratio of solubility of the fungistat in fat to that in an equal weight of water. In the course of the investigation which resulted in the invention described in that application, it was found that by incorporating fungistatic materials into the fat and thence into the yeast-raised baked products, the desired preferential (differential) microbiological inhibition could be obtained. The fungistatic and bacteriostatic properties of the additives carry through into the baked products without bringing into play the undesirable effects of the additives in inhibiting yeast fermentation of the dough prior to baking. All of the microorganisms of concern grow in an aqueous medium. For the inhibitors to be effective, they must be present in the aqueous phase. The process described in the above mentioned application permits the inclusion of at least a major portion of the fungistatic material, or agent, in a fat ingredient which is to be incorporated into the dough. In this way, reduced concentrations of the additives in the aqueous phase of the doughs is effected thereby minimizing interference with yeast fermentation.

During the baking operation, the melting of the fat will release the fungistatic material from the fat permitting it to dissolve into the hot aqueous phase. With some forms of the fungistatic materials, viz., the free carboxylic acids or their alkyl esters, their release from the fat is accelerated by the property of these forms of the fungistatic acids to sublime or volatilize from the fat at elevated baking temperatures, and the increase solubilities of these materials (particularly the free acids) in hot water. With the non-volatile forms of the additives, viz., the alkali-metal or alkaline earth metal salts of the fungistatic acids, such as the sodium or calcium salts of sorbic acid respectively, extraction from the liquefied fats into the aqueous phase is favored by the elevated temperatures encountered during baking. Sublimation of the volatile fungistatic acids from the fat into the aqueous phase is surprisingly not associated with a measurable loss of the fungistatic acids. Apparently, the skin crust formed during the first stage of baking is adequate for locking in the volatile fungistatic acids.

However, in carrying out the invention as described in our aforementioned copending application, the composition of fat and fungistat is composed of between about 70 to about 99% or more of fat. Thus, only between about 1 to 30% by weight of the composition is fungistat. Since the combination of fat and fungistat is a high cost item insofar as the final price of the yeast-raised baked goods are concerned, diminution of the ratio of fat to fungistat would materially enhance the economics of the process and permit greater utilization of the compositions. However, in accordance with the invention described in our aforesaid copending application, it is necessary to employ large amounts of fat in order to obtain very high fungistatic activity without interference with yeast fermentation of the dough.

The present invention is concerned with methods and compositions by which not only the disadvantages mentioned above in connection with the prior art processes are overcome but also the disadvantages referred to above in connection with the process and compositions described in our copending applications are substantially overcome. The present invention permits the use of sorbic acid in sufficiently high concentrations to obtain an acceptable inhibition of microbiological spoilage of yeast-raised baked products without interference with yeast fermentation during the maturation and proofing of the doughs prior to baking.

It is an object therefore of this invention to provide a novel dough in which the interference with yeast fermentation is substantially reduced despite the presence of high concentrations of fungistats.

Another object of this invention is to provide a novel method of preparing acceptable baked goods without seriously extending fermentation times, and yet exhibiting improved resistance to microbiological spoilage.

Other objects of this invention will become apparent from the following detailed description and explanation.

According to this invention, there are provided farinaceous yeast-raised doughs having dispersed therethrough a fat composition in particulate form, comprising sorbic acid as the fungistat which ordinarily interferes with yeast fermentation dispersed in a vehicular fat ingredient, said fungistat being present in an amount of about 60% to 95% by weight of the fat compositions.

The fats in which the sorbic acid component may be incorporated are any mono, di or triglyceride which is solid at about 120° F. However, the preferred fats employed are glyceryl monostearate and completely hydrogenated fats with melting points of about 140–160° F. These fats must all have a quick set on cooling. In using the less preferred fats of melting point of about 120° F. to 140° F., only those with a quick-set may be employed. Thus, partially hydrogenated fats of 125° F. are unsatisfactory whereas coating fats of 125° F. melting point and obtained following interesterification of completely hydrogenated lauric and myriatic type fats with completely hydrogenated domestic oils (viz. cottonseed oil) may be used.

For obtaining the maximum fungistatic activity, the sorbic acid will be present in compositions containing the higher concentrations of fat, and as the ratio of fat to fungistat is decreased, less sorbic acid must be added in the dough formulation. In all cases the ratio of fat to sorbic acid employed in the compositions of this invention is substantially less than that necessary to carry out of teachings in our aforesaid copending application. Thus in using a composition comprising a ratio of fat to fungistat of 70:30, as much as 0.2% sorbic acid may be incorporated into the dough, sorbic acid percentage being expressed on the flour weight basis. In our new compositions consisting of a ratio of fat to sorbic acid of 40:60, the maximum sorbic acid concentration in the dough must be held to about 0.1%. Since bakers are currently satisfied with the fungistatic activity obtained with 0.15% propionates and since sorbic acid is three times as effective as propionate in inhibiting mold spoilage, it is possible to use even lesser amounts of sorbic acid in dough formulation, i.e. less than the 0.1% previously mentioned. Thus, in using compositions comprising a ratio of fat to sorbic acid of 20:80, the maximum sorbic acid concentration in the dough is held to about 0.075%. In using compositions comprising a 10:90 ratio of fat to sorbic acid, the maximum sorbic acid concentration in the dough is held to about 0.05% sorbic acid component and in using compositions comprising a 5:95 ratio of fat to sorbic acid, the maximum concentration of the sorbic acid concentration in the dough is held to about 0.035%. We find that in farinaceous yeast-raised baked products, a dough containing about 0.05% sorbic acid (expressed in the flour weight basis) is effective in inhibiting mold fermentation to an acceptable degree, and for economic reasons, there is no advantage gained in going higher than about 0.1% sorbic acid. Not only does the present invention provide baked products protected as well as or better than noted with the current use of the propionates, but also the objectionable vinegar-like taste of the propionates is eliminated by using the products of the present invention. The flavor of sorbic acid in concentrations up to 0.2% (expressed on the flour weight basis) in baked products is not detectable.

In preparing the fungistat encapsulated in fat compositions, which are subsequently incorporated in farinaceous yeast-raised baked goods, a plurality of thin coatings of fat is applied to the sorbic acid. In applying the fat to the sorbic acid in powder form, the fat is first dissolved in a suitable solvent and is then sprayed onto the powdered sorbic acid component which had previously been placed in equipment suitable for carrying out this process, such as a rotating drum. The solvent is evaporated from the fat coated sorbic acid component by suitable means such as by blowing warm air over the particles and the procedure is then repeated until the desired ratio of fat to sorbic acid is obtained. While we do not wish to be bound by any theory as to why small amounts of fat are suitable for coating the sorbic acid so as to prevent the sorbic acid component from coming into contact with the liquid phase of the farinaceous dough, we believe that the successive thin coatings block up any discontinuities or holes which may exist in the first coating.

The number of coatings which may be applied is usually determined by the amount of fat to be applied to the sorbic acid. There are a number of considerations in selecting a proper solvent for the fat. The solvent must be inert to the sorbic acid, it must not be toxic, and be sufficiently volatile as not to leave any minute residue on the fat coated sorbic acid. Theoretically even only moderately volatile solvents for the fat can be used. However, it is not practical to evaporate off the solvents at excessive temperatures since if the temperature is too high, the fat will soften to the extent that the coated sorbic acid particles will stick together and will no longer be free flowing. For practical purposes, it is desirable to affect the drying at temperatures not substantially in excess of 120° F. Consequently, we prefer to use an inert volatile solvent which has a boiling point not in excess of 212° F. and preferably below 212° F. and in this connection we prefer to use 1,1,1-trichloroethane, which is inert and which boils at about 165° F. as a preferred solvent. Other suitable inert solvents include chloroform, carbon tetrachloride, other volatile halogenated hydrocarbons, petroleum ether, etc. The amount of solvent is not critical. However, the solution of fat in solvent must be thin enough so that it can be satisfactorily applied, preferably by spraying, to form a thin coating.

The invention will be described in connection with the following specific examples in which the effect of a coated sorbic acid component is illustrated as well as the process of coating. The examples are typical only and do not limit the invention to the use of a coated sorbic acid component in the specific formulation set forth. The parts are by weight unless otherwise specified.

EXAMPLE 1

Sorbic acid powder, sifted through a No. 30 mesh screen, is placed in a conventional rotating drum and sprayed with a solution comprising 30% glyceryl monostearate (M.P.=155° F.) in 1,1,1-trichloroethane. After a thin coating has been applied, the spray is interrupted and warm air at about 115° F. is blown over the swirling coated sorbic acid particles. As soon as the solvent has been substantially evaporated, another spraying cycle follows and this is repeated until 10% of fat coating is achieved. This specific example thereby produces a composition comprising a ratio of fat to fungistat of 10:90.

EXAMPLE 2

Sorbic acid powder, sifted through a No. 30 mesh screen, is placed in a conventional rotating drum and sprayed with a solution comprising 30% completely hydrogenated soybean oil (M.P.=160° F.) in carbon tetrachloride solution (B.P.=170° F.). After a thin coating has been applied, the spray is interrupted and warm air at about 115° F. is blown over the swirling coated sorbic acid particles. As soon as the solvent has been substantially evaporated, another spraying cycle follows and this is repeated until 20% by weight of the final mixture is attained. This specific example thereby produces a composition comprising a ratio of fat to fungistat of 20:80.

EXAMPLE 3

Sorbic acid powder, sifted through a No. 30 mesh screen is placed in a conventional rotating drum and sprayed with a solution comprising 40% completely hydrogenated cottonseed oil (M.P.=140° F.) in petroleum ether (B.P.=122° F.). After a thin coating has been applied, the spray is interrupted and warm air at about 110° F. is blown over the swirling coated sorbic acid particles. As soon as the solvent has been substantially evaporated, another spraying cycle follows and this is repeated until 40%, by weight of the final mixture is attained. This specific example thereby produces a composition comprising a ratio of fat to fungistat of 40:60.

EXAMPLE 4

The sorbic acid composition of Example 1 is employed in preparing a dough according to the sponge dough method described earlier in this specification and outlined in Table I. The fungistatic composition is added to the aqueous phase of the final dough at the level of 0.055% (expressed on the total flour weight basis) to provide 0.05% sorbic acid. The baked bread is then subjected to the tests previously described to determine resistance to mold spoilage and the results of these tests are set forth in Table V below.

EXAMPLE 5

The sorbic acid composition of Example 2 is employed in preparing a dough according to the sponge dough method described earlier in this specification and outlined in Table I. The fungistatic composition is added to the aqueous phase of the final dough at the level of 0.094% (expressed on the total flour weight basis) to provide 0.075% sorbic acid. The baked bread is then subjected to the tests previously described to determine resistance to mold spoilage and the results of these tests are set forth in Table V below.

EXAMPLE 6

The sorbic acid composition of Example 3 is employed in preparing a dough according to the sponge dough method described earlier in this specification and outlined in Table I. The fungistatic composition is added to the aqueous phase of the final dough at the level of 0.17% (expressed on the total flour weight basis) to provide 0.10% sorbic acid. The baked bread is then subjected to the tests previously described to determine resistance to mold spoilage and the results of these tests are set forth in Table V below.

For the control in evaluating the products of Examples 4–6, a bread exactly the same in composition is prepared but without the added sorbic acid composition. In addition, further controls are included, requiring the preparation of breads with uncoated (free) sorbic acid at the same levels as in Examples 4–6. Table V below shows how the products of the present invention do not interfere with yeast fermentation during dough maturation and proofing and yet protect the breads against mold spoilage.

TABLE V

*Value of the Sorbic Acid Compositions of the Present Invention in Providing Bread Resistant to Mold Spoilage and Yet Without Interfering With Yeast Fermentation of the Dough*

| Test | Identity [1] | Sorbic acid added,[2] percent | Proof time,[3] min. | Bread size,[4] in. | Mold growth after inoculation [5] | | |
|---|---|---|---|---|---|---|---|
| | | | | | Test one—On crust after 96 hours | Test two—Between slices after 72 hours | Test three—On exposed slices after 48 hours |
| Control (a) | No SA added | 0.00 | 80 | 46.0 | XXX | XXXX | XXXXXX |
| Control (b) | Free SA added | 0.05 | 97 | 45.5 | 0 | XX | XXX |
| Example 4 | Fat-coated SA added (ratio of 10:90) | 0.05 | 79 | 46.0 | 0 | XX | XXX |
| Control (a) | No SA added | 0.00 | 80 | 46.0 | XXX | XXXX | XXXXXX |
| Control (b) | Free SA added | 0.075 | 109 | 45.0 | 0 | X | X |
| Example 5 | Fat-coated SA added (ratio of 20:80) | 0.075 | 81 | 46.0 | 0 | X | X |
| Control (a) | No SA added | 0.00 | 80 | 46.0 | XXX | XXXX | XXXXXX |
| Control (b) | Free SA added | 0.10 | 125 | 44.5 | 0 | 0 | 0 |
| Example 6 | Fat-coated SA added (ratio of 40:60) | 0.10 | 80 | 46.0 | 0 | 0 | 0 |

[1] SA—Sorbic acid; ratio indicated is that of fat to sorbic acid.
[2] Percentages expressed on the total flour weight basis. Values on a dough basis are 55% and on a bread basis 66% of the percentages listed above.
[3] Twenty ounces of dough allowed to rise in the pan to the same height.
[4] Summation in inches of two perimeters of the loaf, one measured lengthwise at the center of the loaf, the other measured widthwise, also at the center of the loaf.
[5] See text for description of test methods; "O" means no growth; "X's" reflect degree of growth.

The terms "fungistat" and "mold inhibiting agent" or material employed in this specification are not used in a narrow sense of preventing mold growth, but are used generically to include substances that may either retard or prevent such growth. The terms also encompass the bacterial inhibiting properties of the substances. The terms "microorganisms" and "microbiological" are also employed in their generic sense and are intended to include a number of bacterial species as well as fungi.

Having thus provided a written description of the present invention and provided specific examples thereof, it should be understood that no undue restrictions or limitations are to be imposed by reason thereof but that the present invention is defined by the appended claims.

We claim:

1. A farinaceous yeast-raised dough having dispersed therethrough a particulate fat composition consisting essentially (a) about 0.035 to about 0.1% sorbic acid, based upon the weight of the flour, as the fungistat which ordinarily interferes with yeast fermentation and (b) a vehicular fat ingredient having a melting point of at least about 120° F., said fungistat being incorporated in said vehicular fat and present in an amount of about 60 to about 95% by weight of said fat composition.

2. A farinaceous yeast-raised dough according to claim 1 wherein said fat is selected from the group consisting of glyceryl monostearate and completely hydrogenated fat.

3. A farinaceous yeast-raised dough having dispersed therethrough a particulate fat composition consisting essentially of (a) about 0.05 to about 0.1% sorbic acid, based upon the weight of the flour, as the fungistat which ordinarily interferes with yeast fermentation and (b) a vehicular fat ingredient having a melting point of about 120 to about 160° F., said fungistat being incorporated in said vehicular fat and being present in an amount of about 60 to about 90% by weight of said fat composition.

4. A farinaceous yeast-raised dough according to claim 3 wherein said fat is selected from the group consisting of glyceryl monostearate and completely hydrogenated fat and has a melting point of at least about 140° F.

5. The process of manufacturing yeast-leavened farinaceous baked products which comprises incorporating into a yeast-containing dough, a particulate fat composition consisting essentially of about 0.035% to about 0.1% of sorbic acid based upon the weight of the flour as the fungistat which ordinarily interferes with yeast fermentation, encapsulated in a vehicular fat having a melting point of at least about 120° F., said fungistat comprising about 60 to 95% by weight of said fat composition, and baking the dough at a temperature at which the fat melts thereby releasing the fungistat throughout the resultant baked product.

6. The process of manufacturing yeast-leavened farinaceous baked products according to claim 5, wherein said fat is selected from the group consisting of glyceryl monostearate and completely hydrogenated fat.

7. The process of manufacturing yeast-leavened farinaceous baked products which comprises incorporating into yeast-containing dough, a particulate fat composition consisting essentially of (a) about 0.05% to about 0.1%, based on the weight of the flour, of sorbic acid as a fungistat which ordinarily interferes with yeast fermentation and (b) a vehicular fat ingredient having a melting point of at least about 120° F., said fungistat being incorporated in said vehicular fat and comprising about 60 to about 90% by weight of said fat composition, and baking the dough at a temperature at which the sorbic acid is released throughout the resultant baked product.

8. The process of manufacturing yeast-leavened farinaceous baked products which comprises incorporating into a yeast-containing dough a particulate fat composition consisting essentially of (a) about 0.05% to about 0.1%, based on the weight of the flour, of sorbic acid as a fungistat which ordinarily interferes with yeast fermentation, and (b) a fat having a melting point of at least about 140° F., said fungistat comprising about 60% to about 90% by weight of said fat composition, and baking the dough at a temperature at which the sorbic acid is released throughout the resultant baked product.

References Cited in the file of this patent

UNITED STATES PATENTS

| | | |
|---|---|---|
| 2,970,915 | Ferrari | Feb. 7, 1961 |
| 2,971,845 | Ferrari | Feb. 14, 1961 |
| 2,997,394 | Melnick et al. | Aug. 22, 1961 |